Jan. 26, 1932.　　　　　K. ROLLE　　　　　1,842,631

MANUFACTURE OF LEAD-IN WIRES

Filed July 20, 1929

Steps

1  DUMET FEED　　　　　　　　Gage Point
   DUMET Wire Cut to length

2  Dumet transferred to Copper feed position

3a Fed Copper Welded & Cut to length    Cut to length-Copper feed
   DUMET   Copper   Welding 3b Cut to length-Nickel feed    Fed Nickel Welded & Cut to length
   DUMET
   Nickel   Welding 4a Transfer Copper-DUMET to Nickel feed Position & Preheat Nickel    DUMET    Copper
   Nickel wire feed Preheated End 4b Nickel    DUMET & preheat Copper    Transfer Nickel-Dumet to Copper feed position
   Copper wire feed Preheated End 4c Nickel wire feed    DUMET    Copper wire feed 5  Nickel    DUMET    Copper
             Welding

6  EJECT THREE PIECE WELDED WIRE

Inventor
KARL ROLLE
By his Attorneys
Darby & Darby

Patented Jan. 26, 1932

1,842,631

UNITED STATES PATENT OFFICE

KARL ROLLE, OF NEWARK, NEW JERSEY, ASSIGNOR TO DE FOREST RADIO COMPANY, OF JERSEY CITY, NEW JERSEY, A CORPORATION OF DELAWARE

MANUFACTURE OF LEAD-IN WIRES

Application filed July 20, 1929. Serial No. 379,694.

This invention relates to methods of uniting wires of diverse composition and with particularity to a method of manufacturing combined lead-in and electrode supports for evacuated vessels.

One of the objects of this invention is the provision of a method whereby a uniform weld may be obtained between two wires.

Another object of this invention is the provision of a novel method whereby three pieces of wire, each of different chemical composition may be uniformly welded into a single continuous wire conductor for use as a lead-in wire for an evacuated vessel.

Another object of this invention is the provision of a novel method whereby different kinds of wire may be uniformly and efficiently welded.

Another object of this invention is the provision of a novel method and process whereby dumet wire may be uniformly and efficiently welded to other kinds of wire.

Another object of this invention is the provision of a novel method and process whereby a length of dumet wire may be uniformly welded to a nickel wire on one end thereof and a copper wire on the other end thereof.

Another object of this invention is the provision of a novel method whereby a lead-in wire, adapted to be used in an electron discharge device is made up of three different types of wire and is formed by successive welds.

Another object of this invention resides in the provision of a series of steps wherein nickel, dumet and copper wires are properly cut, each to a predetermined length and joined by a novel method of uniform welding to yielding a tri-part wire of nickel, dumet and copper joined by at least two welds.

Another object of this invention is the utilization of preheating as one step towards obtaining uniformity of welding.

This invention resides substantially in the steps, the combination of steps, the succession and order of steps, all as will be fully indicated hereinafter. In the accompanying drawings there are shown diagrammatically six general steps, the third and fourth of which are capable of modification.

It is the usual practice in electron discharge devices to provide electrode support and lead-in wires which pass through a glass standard or press, which carries the various electrode supporting rods. These supporting rods usually are conductors and the portion thereof which passes through the press has usually the same coefficient of expansion as the glass. For purpose of economy, this "seal-in" portion is usually very short and has welded thereto at one end, an electrode supporting wire and at the other end a "lead-in" wire.

It has been found that a wire which serves very well for "seal-in" purposes is dumet, while nickel wire is usually employed within the tube for supporting the electrodes. For the purpose of "lead-in" wire, copper or other similar metal may be used. Disadvantages have heretofore been encountered in the manufacture of a tri-part wire made up of successive sections of copper, dumet and nickel.

The first difficulty which was encountered was in the provision of a uniform weld. Although it is old in the art to weld materials together by electric welding or by ordinary heat welding it has been found that when dumet is welded to nickel or copper that the weld may not be uniform in all cases and there is danger that the completed wire might break while in use within the tube. There is also danger that the wires made up in large batches may break at the point of the weld while in the operator's hand or during the process of assembly, and there is still the further difficulty that a wire not uniformly and properly welded is difficult of insertion within the vacuum tube standard.

By employing a sequential arrangement of steps that are disclosed hereinafter not only is a uniform weld secured, but also by the proper use and application of preheating the percentage of breakage in the completed weld is materially reduced.

Referring particularly to the drawings, there is disclosed diagrammatically a series of six steps. The third step thereof being susceptible of two modifications, and the fourth step thereof being capable of three different modifications.

The first step according to the invention is the unreeling of dumet wire, from a supply spool to a gauge point, at which gauge point a predetermined length of dumet is mechanically severed. This severed piece of dumet wire is then transferred, in the second step, to what may be called copper feed position. That is it is transferred into alignment with the copper wire which is being unreeled from a copper wire spool. If it is desired to weld dumet to nickel in the first instance, rather than to copper, the several pieces of dumet are transferred to what may be termed the nickel feed position, that is, in alignment with the nickel wire which is being unreeled from a nickel wire supply spool. The severed dumet wire having been transferred either to the copper feed position (Fig. 3a) or to the nickel feed position (Fig. 3b) is thereupon welded thereto. The copper or nickel, as the case may be, is then cut to the approximate length by a suitable cutting jaw.

This weld is accompanied by a preheating of the end of the copper or nickel wire which is to be welded to the dumet by any suitable heating means. I have found that by gradually bringing up the temperature at the end which is to be welded that a uniform weld is obtained when the welding temperature is applied to the point of contemplated union. Under certain circumstances it may be required that the dumet wire have a diameter, which is smaller than the diameter of the copper or nickel wire to which it is to be welded thus necessitating a preheating of the copper, or nickel wire so that the heat density throughout the larger volume of material at the point of union on the copper or nickel wire will conform to the heat density throughout the smaller volume of material at the point of union at the ends of the dumet wire which is therefore uniformly heated during the actual welding operation. Having preheated the end of the copper or nickel wire depending upon whether step 3a or 3b is chosen as the desirable third step and having applied the preliminary heat thereto, the next step is the actual welding of the dumet to the copper or nickel, as the case may be. The welded two piece wire of dumet and copper or dumet and nickel now welded and cut at the feeding end from the spool is moved to what may be termed nickel or copper feed. That is, if the copper has been joined to dumet, the copper-dumet wire is transferred to a point in line with the nickel feed, where nickel wire is fed and unreeled from a nickel wire supply spool. If the step 3b has been followed the nickel-dumet wire is transferred to what may be termed the copper feed position where copper wire is fed and unreeled from a copper wire supply spool. Thus the two piece wire is now in line with the wire of the third type, that is to be joined to the unwelded end of the dumet. The unwelded end of the nickel or copper, and the unwelded end of the dumet are next preheated, and then welded in any desirable manner.

It is to be noted that in the steps 4a and 4b as in the steps 3a and 3b, the wire fed from the spool may be cut to a predetermined length either before or after the welding step. Of course, if the step 3a is followed it is necessary that the step 4a be followed. Likewise, if the step 3b be followed after the step 2 has been accomplished, it is necessary that the step 4b be followed. Thus up to this point, the procedure would comprise either steps 1, 2, 3a and 4a or steps 1, 2, 3b and 4b. In step 5, the wire is finally cut to length, that is after the various cutting operations and welding operations have taken place. There subsequently follows a sixth step, wherein the three piece welded wire is ejected from the apparatus and delivered to a suitable receiving hopper or the like.

It may be found desirable that after step 1 has been accomplished that the dumet instead of being transferred to a copper feed or to a nickel feed position be transferred to a point in line with two feeds, that is in line with wires being fed from two supply spools, such as is shown in step 4c. In step 4c, the dumet is transferred to a point in line with the wire that is fed and unreeled from both a nickel supply spool and also from a copper supply spool. The junction to be welded may be preheated as above described prior to the actual welding operation. Likewise the cutting operations may be effected either simultaneously or subsequently. It is quite apparent that should it be desired the welding may be accomplished in the various steps herein disclosed without the use of preheating. That is, the series of steps disclosed may be all successfully adapted to yield a completed wire either with or without the utilization of preheating.

Inasmuch as many changes can be made in the above step and series of steps and many apparently widely different series of steps could be followed without departing from the scope thereof, it is intended that all matter contained in the above description or shown in the accompanying drawings shall be interpreted as illustrative and not in a limiting sense.

What I seek to secure by United States Letters Patent is:

1. The method of forming vacuum tube lead-in wire in three connected sections, each of a diverse chemical composition from that of the other, which consists in feeding to a gauge point the wire for the central section and cutting it to length, feeding to a gauge point the wire for one end section and cutting it to length, preheating the end section which is to be welded to the central piece, welding said end section and said central section together, transferring the welded sections to a point in line with a third type of wire which is to be joined to the other end of said central section and welding the third wire to said central section.

2. The method of forming a vacuum tube lead-in wire of three sections of material, each of a diverse chemical composition from that of the other, which consists in feeding to a gauge point the wire for the central section and cutting it to length, feeding to a gauge point the wire for one end section and cutting it to length, pre-heating and then welding said end section and said central section together, transferring the welded two-piece wire to a point in line with a third type of wire, and cutting said third type of wire to a predetermined length and welding said third type of wire to said central section.

3. The method of forming a vacuum tube lead-in wire of three pieces of material, each of a diverse chemical composition from that of the other, which consists in feeding the wire for the central piece and cutting it to length, unreeling the wire for the end piece and cutting it to length, welding said end piece and said central piece together, transferring the joined two piece wire to a point in line with a third type of wire, cutting said third type of wire to a predetermined length, preheating the end of said third type of wire, welding said preheated end and the free end of said central piece of wire, together, and subsequently ejecting said joined three piece welded wire.

4. The method of forming a vacuum tube lead-in wire consisting of a central portion of dumet and two end sections of copper and nickel, which comprises feeding the dumet and cutting it to length, pre-heating the ends of said materials to be welded, welding the cut dumet at one end to the preheated piece of copper wire, welding the said cut dumet at the other end to the preheated piece of nickel wire.

5. The method of forming a vacuum tube lead-in wire of three sections of material, each of a diverse chemical composition from that of the other, which consist in unreeling the wire for the central section thereof and cutting it to length, unreeling the wires for the end sections, cutting said end sections to length, preheating the ends of said end sections to be joined to the central section, welding said preheated ends to said central section and ejecting the three piece welded wire thus formed.

6. The method of forming a vacuum tube lead-in welded wire consisting of sections of nickel, dumet and copper respectively which consists in feeding dumet wire and cutting it to length, transferring said cut dumet wire to a point in alignment with the ends of the nickel and copper wire, cutting said nickel and copper wires, preheating one end of said nickel wire, and welding said dumet wire at opposite ends to said nickel and copper wire, respectively, and ejecting the said joined three piece welded wire.

7. The method of forming a vacuum tube lead-in wire consisting of nickel, dumet and copper sections which includes cutting a supply of dumet wire to length, transferring the dumet wire to a point in between two lengths of wire, one of nickel and one of copper, feeding said nickel and copper wires to a gauge point and cutting the same to length, preheating the ends of said nickel and copper wire and welding said dumet wire to said nickel and copper wire.

8. The method of forming a vacuum tube lead-in wire consisting of sections of nickel, dumet and copper respectively which consists in unreeling dumet wire, cutting said dumet wire to length, transferring the cut dumet into alignment with a length of nickel wire and a length of copper wire, preheating the ends of said copper and nickel wire, and welding said dumet wire to said preheated ends.

9. The method of manufacturing a unitary lead in and electrode support for vacuum tubes comprising cutting a length of wire, cutting another length of wire, and cutting a third length of wire, said other length having substantially the same coefficient of expansion as the tube material, preheating the ends of said wires and welding the preheated ends together.

In testimony whereof I have hereunto set my hand on this first day of July A. D., 1929.

KARL ROLLE.